US009893470B2

(12) United States Patent
Allwood et al.

(10) Patent No.: US 9,893,470 B2
(45) Date of Patent: *Feb. 13, 2018

(54) TELECOMMUNICATIONS CABLING SYSTEM, AND ELECTRICAL CONNECTION MODULE SHIELDING INTERFACE THEREFOR

(71) Applicant: CommScope Technologies LLC, Hickory, NC (US)

(72) Inventors: Brent David Allwood, Buttaba (AU); Kavita Purohit, Mardi (AU); Bryce Lindsay Nicholls, Green Point (AU); Wayne William Dennes, Wyoming (AU); Kevin James Truskett, Kincumber (AU)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,569

(22) Filed: Jun. 7, 2016

(65) Prior Publication Data
US 2016/0301162 A1    Oct. 13, 2016

Related U.S. Application Data

(63) Continuation of application No. 14/368,073, filed as application No. PCT/AU2012/001577 on Dec. 20, 2012, now Pat. No. 9,368,917.

(30) Foreign Application Priority Data

Dec. 23, 2011 (AU) ................. 2011265514
Dec. 23, 2011 (AU) ................. 2011265515
Dec. 23, 2011 (AU) ................. 2011265516

(51) Int. Cl.
*H01R 13/60*    (2006.01)
*H01R 13/6585*    (2011.01)
(Continued)

(52) U.S. Cl.
CPC ....... *H01R 13/6585* (2013.01); *H01R 13/518* (2013.01); *H01R 13/6463* (2013.01);
(Continued)

(58) Field of Classification Search
CPC .... H01R 24/64; H01R 24/62; H01R 13/6463; H01R 13/518; H01R 13/506; H01R 31/06;
(Continued)

(56) References Cited

U.S. PATENT DOCUMENTS 4,767,355 A    8/1988 Phillipson et al.
5,773,763 A    6/1998 Stachulla
(Continued)

FOREIGN PATENT DOCUMENTS

WO    98/056078    12/1998
WO    2008/048439    4/2008
(Continued)

OTHER PUBLICATIONS

International Search Report for International Application No. PCT/AU2012/001577 dated Apr. 19, 2013 (6 pages).

*Primary Examiner* — Xuong Chung Trans
(74) *Attorney, Agent, or Firm* — Merchant & Gould P.C.

(57) ABSTRACT

A telecommunications cabling system, including:
(a) an earthed support; and
(b) at least one connection module mounted to the earthed support, including:
  (i) a housing for a plurality of electrical contact members, the housing having a plurality of recesses to receive wires of at least one shielded cable;
(Continued)

(ii) at least one opening to receive an end of an electrical connector to place electrical contacts at the end of the electrical connector in direct or indirect electrical communication with at least some of the wires; and (iii) a shielding interface for the connection module;

wherein the shielding interface is simultaneously contactable with shielding of the shielded cable, a corresponding shielding interface of the electrical connector, and the earthed support.

9 Claims, 17 Drawing Sheets

(51) Int. Cl.
| | |
|---|---|
| *H04Q 1/06* | (2006.01) |
| *H04Q 1/02* | (2006.01) |
| *H01R 13/6471* | (2011.01) |
| *H01R 13/659* | (2011.01) |
| *H01R 24/60* | (2011.01) |
| *H01R 13/518* | (2006.01) |
| *H01R 13/6463* | (2011.01) |
| *H01R 13/6589* | (2011.01) |
| *H01R 13/6599* | (2011.01) |
| *H01R 9/03* | (2006.01) |
| *H01R 9/24* | (2006.01) |
| *H01R 4/24* | (2018.01) |
| *H01R 12/72* | (2011.01) |
| *H01R 107/00* | (2006.01) |

(52) U.S. Cl.
CPC ....... *H01R 13/6471* (2013.01); *H01R 13/659* (2013.01); *H01R 13/6589* (2013.01); *H01R 13/6599* (2013.01); *H01R 24/60* (2013.01); *H04Q 1/06* (2013.01); *H04Q 1/13* (2013.01); *H01R 4/2429* (2013.01); *H01R 9/034* (2013.01); *H01R 9/037* (2013.01); *H01R 9/2416* (2013.01); *H01R 9/2491* (2013.01); *H01R 12/721* (2013.01); *H01R 2107/00* (2013.01); *H01R 2201/04* (2013.01); *H01R 2201/16* (2013.01)

(58) Field of Classification Search
CPC ................ H01R 24/60; H01R 2201/04; H01R 13/6471; H01R 4/2433
See application file for complete search history.

(56) References Cited

U.S. PATENT DOCUMENTS

| | | | | |
|---|---|---|---|---|
| 6,077,113 | A | 6/2000 | LeComte | |
| 6,086,415 | A | 7/2000 | Sanchez | |
| 7,722,402 | B2 | 5/2010 | Pepe | |
| 7,817,444 | B2* | 10/2010 | Dennes | H02G 3/30 |
| | | | | 361/825 |
| 7,896,697 | B2* | 3/2011 | Dennes | H01R 13/6585 |
| | | | | 439/607.08 |
| 7,901,254 | B2* | 3/2011 | Dennes | H01R 9/2416 |
| | | | | 439/404 |
| 9,368,917 | B2* | 6/2016 | Allwood | H01R 13/6471 |
| 2009/0227141 | A1 | 9/2009 | Pan | |

FOREIGN PATENT DOCUMENTS

| | | |
|---|---|---|
| WO | 2008/119370 | 10/2008 |
| WO | 2011/147100 | 12/2011 |

* cited by examiner

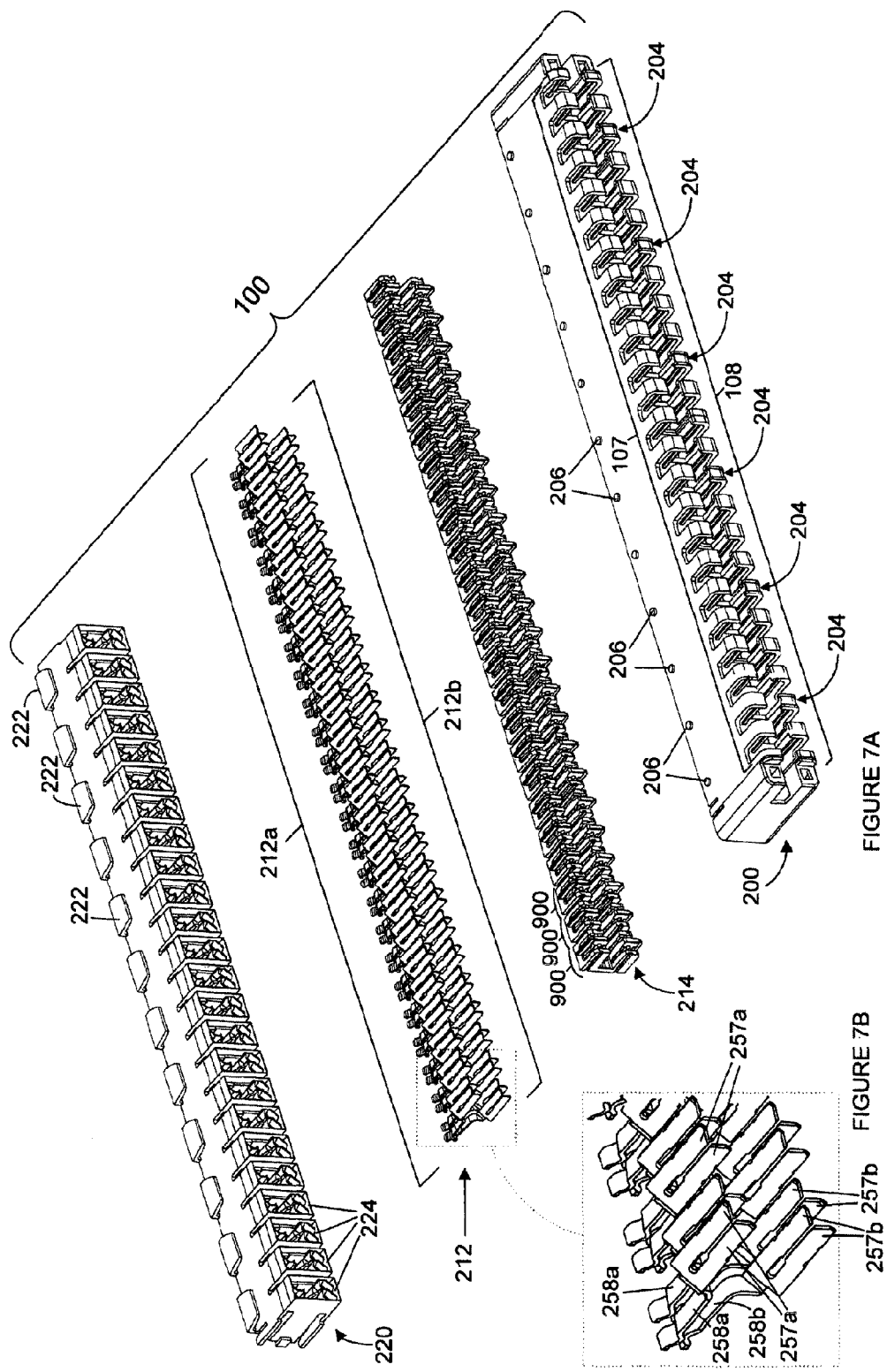

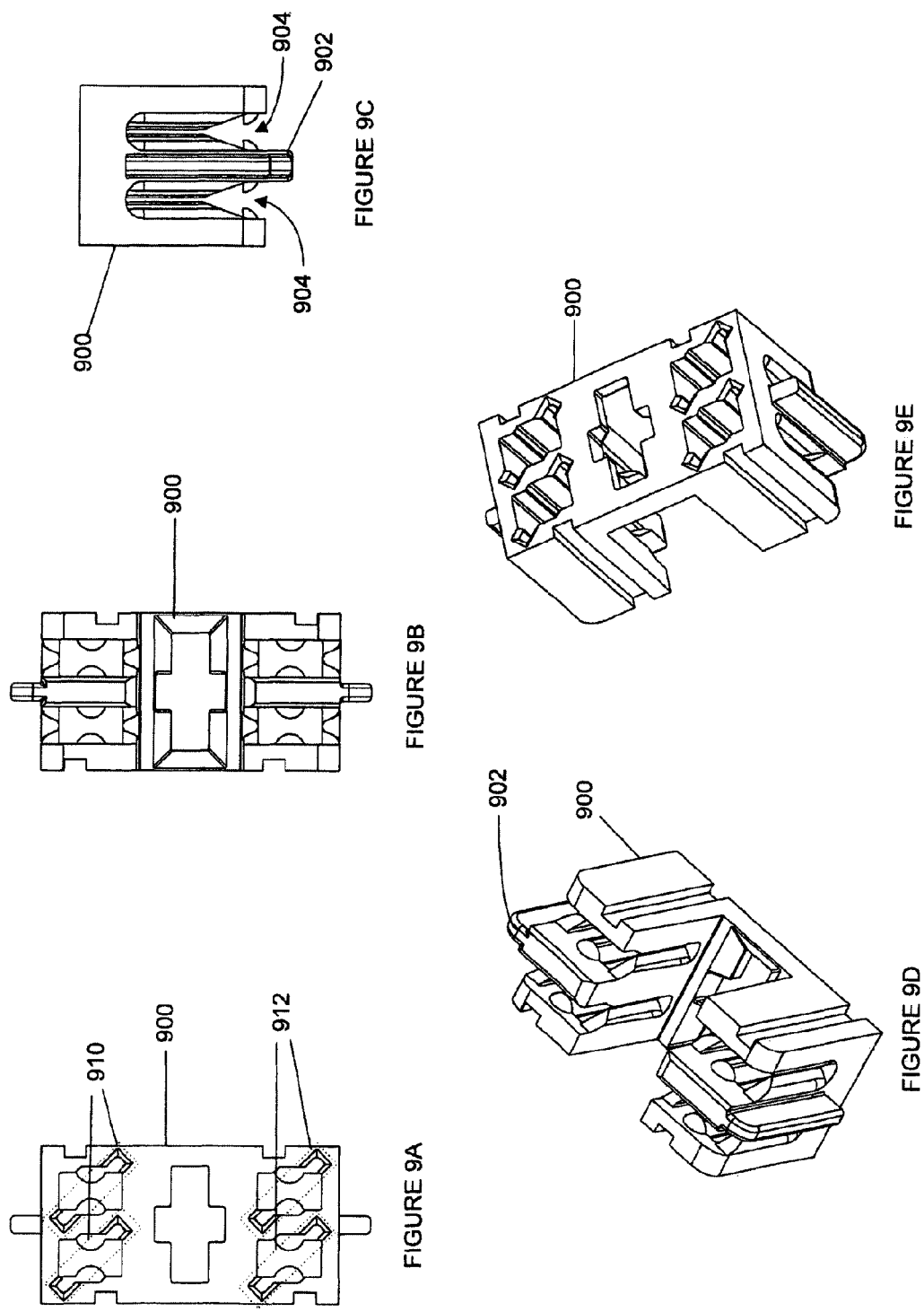

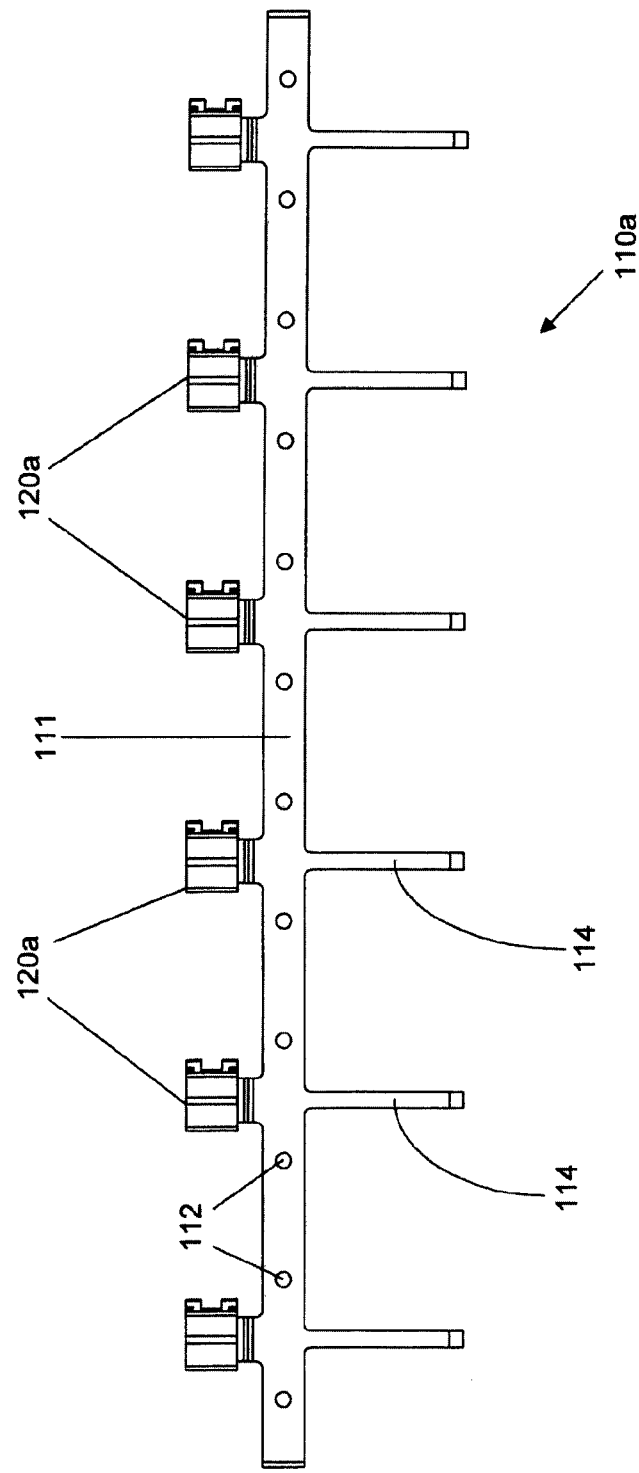

TELECOMMUNICATIONS CABLING SYSTEM, AND ELECTRICAL CONNECTION MODULE SHIELDING INTERFACE THEREFOR

This application is a Continuation of U.S. application Ser. No. 14/368,073, filed 23 Jun. 2014, now U.S. Pat. No. 9,368,917 which is a National Stage Application of PCT/AU2012/001577, filed 20 Dec. 2012, which claims benefit of Serial No. 2011265514, Serial No. 2011265515, and Serial No. 2011265516, filed 23 Dec. 2011 in Australia and which applications are incorporated herein by reference. To the extent appropriate, a claim of priority is made to each of the above disclosed applications.

TECHNICAL FIELD

The present invention relates to a telecommunications cabling system for use in a telecommunications network.

BACKGROUND

In the field of telecommunications, wires used to carry the telecommunications signals are susceptible to noise from a variety of sources, including neighbouring wires in the same cable which may introduce near-end crosstalk (NEXT) or far-end crosstalk (FEXT), and nearby cables which may introduce alien crosstalk (AXT). As data transmission rates increase, the effect of this noise on error rates also increases.

Various attempts have been made in the past to minimise noise in telecommunications signals. For example, in twisted-pair cabling used in telecommunications networks, adjacent pairs in the cable generally have different twist rates, and the pairs may be individually shielded from electromagnetic interference using foil. The collection of pairs in the cable may be further shielded using a foil screen. This type of cable generally includes a grounding wire, also called a drain wire, to provide a grounding for the cable.

Typically, cables of the type described above are used to cross-connect telecommunications equipment at a premises. This may take place via patch panels which may include front and rear connection locations.

Another type of cabling system, known in the art as a "patch-by-exception" system, has hardwired cross-connections between connection modules to electrically connect ports of a data or voice switch/router with end user equipment. The connection modules generally include insulation displacement contacts (IDCs) onto which wires of respective twisted-pair cables are terminated to form the cross-connections, and the IDCs may include a spring contact which can be separated to break the connection. This type of connection module is sometimes known as a disconnect module. For example, the spring contacts may receive electrical contact-bearing fingers of a printed-circuit board (PCB) of a patch cord, for example of the type shown in PCT application PCT/EP2007/006369 (WO 2008/119370), the contents of which are hereby incorporated by reference in their entirety. The ends of such a patch cord may be plugged into the disconnect modules at any desired pair of locations in order to divert the data or voice signal from its original hardwired path to a new path between the desired pair of locations, thus creating a patched configuration which is an exception to the original (default) hardwired configuration.

It would be desirable to provide a patch-by-exception system with decreased susceptibility to electromagnetic interference, or at least to provide a useful alternative.

SUMMARY OF THE INVENTION

In one aspect, the present invention provides a telecommunications cabling system, including:
(a) an earthed support; and
(b) at least one connection module mounted to the earthed support, including:
(i) a housing for a plurality of electrical contact members, the housing having a plurality of recesses to receive wires of at least one shielded cable;
(ii) at least one opening to receive an end of an electrical connector to place electrical contacts at the end of the electrical connector in direct or indirect electrical communication with at least some of the wires; and
(iii) a shielding interface for the connection module;
wherein the shielding interface is simultaneously contactable with shielding of the shielded cable, a corresponding shielding interface of the electrical connector, and the earthed support.

The shielding interface may be contactable with the earthed support by opposed ends of an electrically conductive member.

The at least one connection module may be mounted to the earthed support by a cable management member. The cable management member may include a bracket for the electrically conductive member.

In certain embodiments, the electrically conductive member is contactable with the shielding interface by an interference fit.

The shielding interface may include at least one conductive clasp to receive the shielding of the at least one shielded cable. The conductive clasp may have a substantially C-shaped cross section. The conductive clasp may have a recess to receive a cable tie to fasten the conductive clasp to the shielded cable. The or each said conductive clasp may extend from an elongate conductive strip or bar.

In certain embodiments, the shielding interface includes retaining means for retaining the shielding interface on the housing of the connection module. The retaining means may include one or more fingers configured to bear against the housing. The fingers may be received in grooves of the housing. The retaining means may include one or more apertures shaped to fit corresponding protrusions on the housing. Alternatively, or in addition, the retaining means may include one or more protrusions shaped to fit corresponding apertures in the housing. The one or more apertures and/or the one or more protrusions may be disposed oppositely to the one or more fingers on the shielding interface.

In certain embodiments, the housing includes an outer shell to which the shielding interface is attached. At least part of the outer shell may be conductive. In certain embodiments, the outer shell includes a conductive polymer. The conductive polymer may be a metallised polymer.

In embodiments with a conductive outer shell, the electrical contact members may be received in an insulating means of the housing to prevent electrical communication between the outer shell and the electrical contact members. The insulating means may include a plurality of insulating members. Each insulating member may include an upper pair of cavities and a lower pair of cavities to receive respective pairs of electrical contact members. The insulating members may have a central axis which is parallel to a long axis of the connection module, the cavities being angled at 45 degrees to the central axis.

In certain embodiments, the connection module includes two rows of pairs of insulation displacement contact slots. The electrical contact members may include bifurcated contact arms extending into respective insulation displacement contact slots for electrical connection to the wires of the shielded cable when seated in the insulation displacement contact slots. The or each opening of the housing may be arranged between opposed pairs of slots in said rows of slots, each being shaped to receive the end of an electrical connector. A resilient end of each electrical contact member of an upper row (of the two rows of pairs of insulation displacement contact slots) may in contact with a resilient end of a corresponding electrical contact member of a lower row.

In certain embodiments, wire-receiving recesses of the insulating means are accessible via the recesses of the connection module housing.

BRIEF DESCRIPTION OF THE DRAWINGS

Preferred embodiments of the invention will now be described, by way of non-limiting example only, with reference to the accompanying drawings in which:

FIG. 7A is an exploded view of the module of FIG. 6;

FIG. 7B is a detail of part of FIG. 7A;

FIG. 9A is a rear plan view of an example of a contact carrier for use with the module of FIG. 6;

FIG. 9B is a front plan view of the contact carrier of FIG. 9A;

FIG. 9C is a top plan view of the contact carrier;

FIGS. 9D and 9E are front and rear perspective views, respectively, of the contact carrier;

FIG. 10B is a top plan view of the shielding bar of FIG. 10A;

DETAILED DESCRIPTION

Where the terms "front", "rear", "top", "bottom", "upper", "lower" and the like are used below, it will be understood that these are used simply to describe the orientations of various components relative to each other, and are not intended to be construed in an absolute sense. Accordingly, the skilled person will understand that these terms should be interchanged appropriately when the orientation of the system (relative to a user, for example) is changed.

Figure 1:
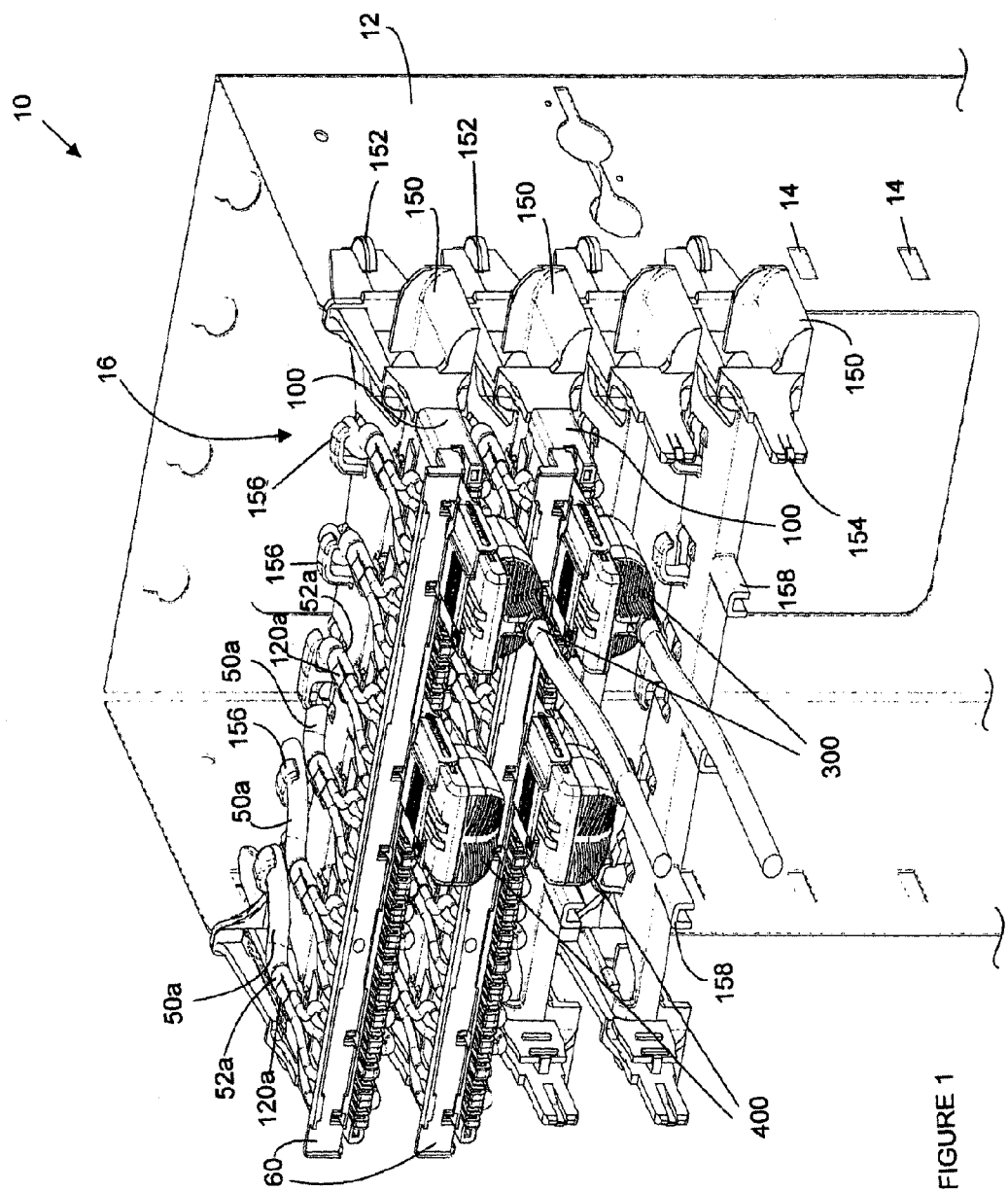
FIG. 1 is a perspective view of an example of a telecommunications cabling system including connection modules mounted to a back-mount frame.
Figure 2:
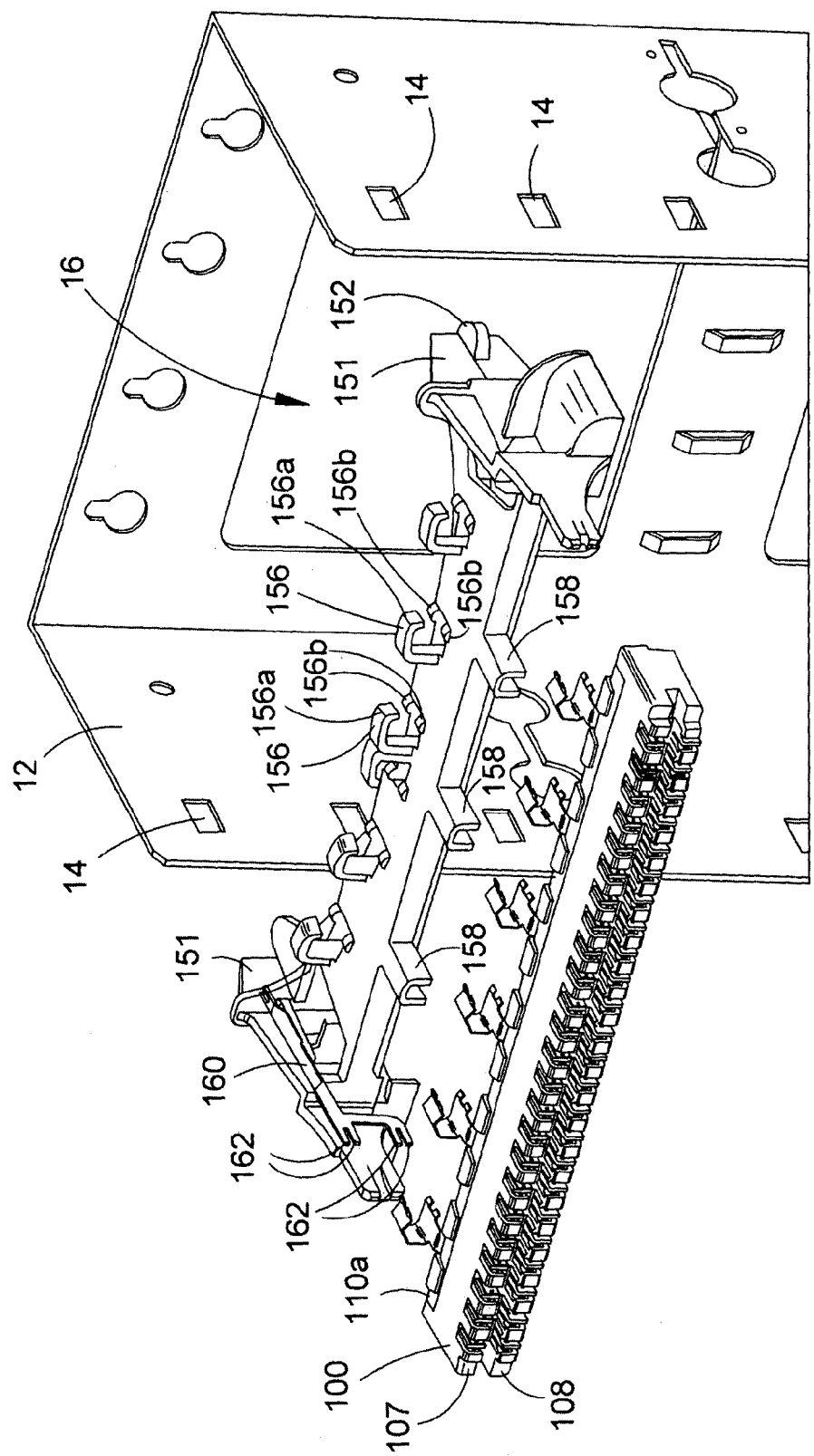
FIG. 2 is a partial exploded view of the system of FIG. 1.
Figure 3:
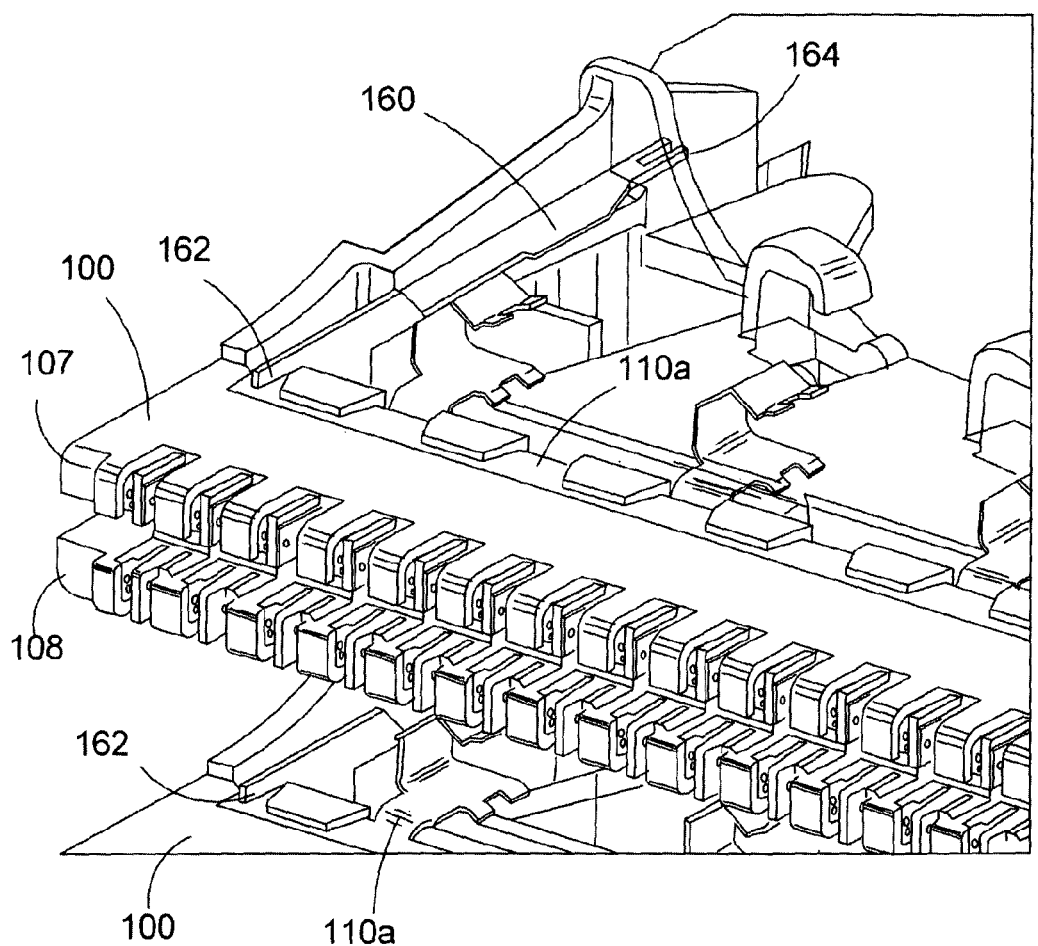
FIG. 3 is a detail of part of the system of FIG. 1.
Figure 4:
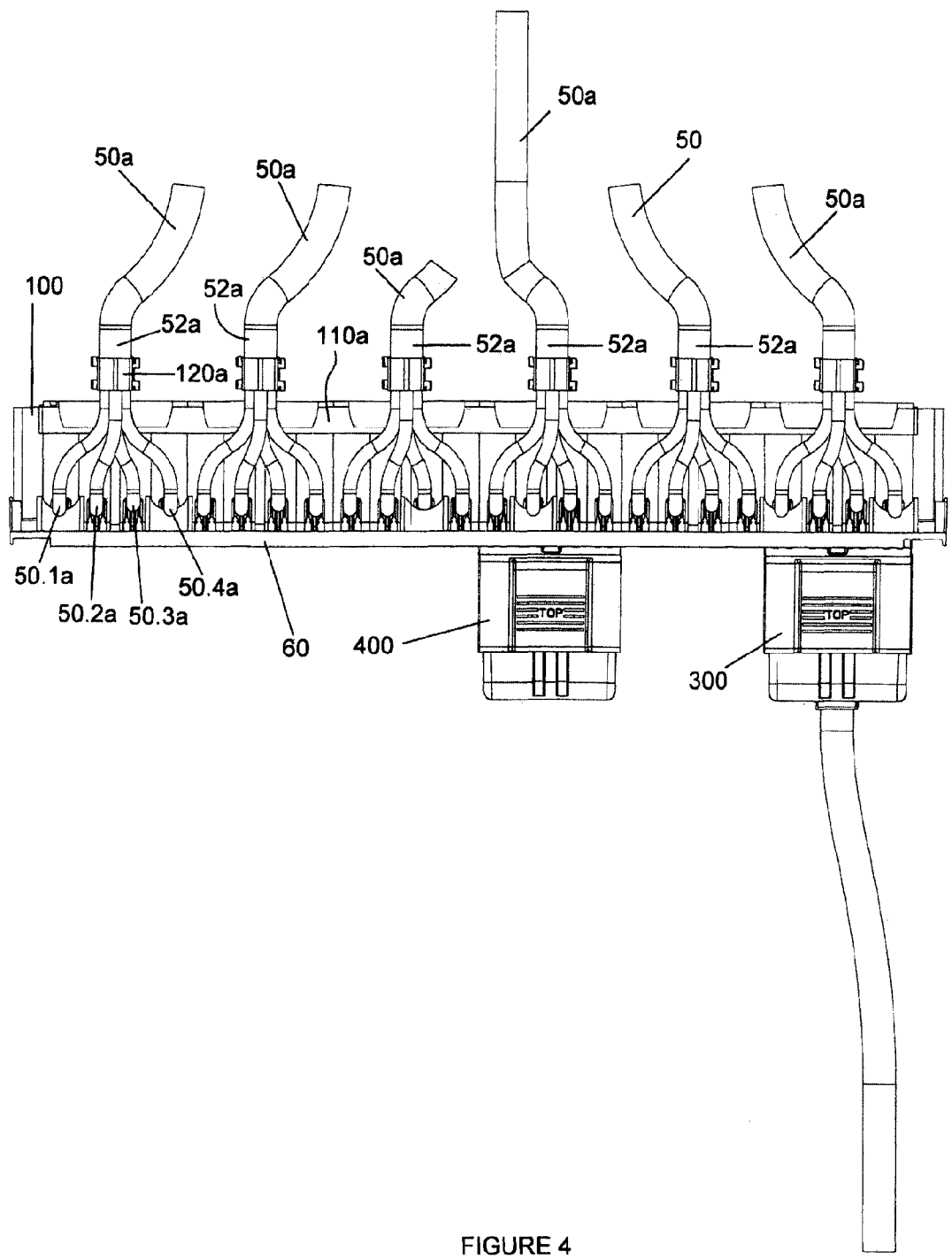
FIG. 4 is a top plan view of a connection module having a plurality of shielded cables terminated thereon.

Referring to FIGS. 1 to 3, there is shown a telecommunications cabling system 10 including an earthed support (backmount frame) 12 to which connection modules 100 are mounted, via respective cable managers 150. In use, telecommunications cables 50a housed in backmount frame 12 can be fed through cable retention members 156 on respective top surfaces of the cable managers 150, and wires of the cables 50a terminated on the connection modules 100 (FIG. 4).

With reference to FIG. 7A, each connection module 100 includes a housing for a plurality of electrical contact members 212. Each electrical contact member includes an insulation displacement contact (IDC) which is seated inside the housing in a manner which will later be described. The housing includes an outer shell 200 and an inner shell 220 between which electrical contact members 212 are retained.

The housing 200, 220 has a plurality of recesses 202 (FIG. 8) to receive wires of at least one shielded cable 50a for termination of the wires onto the electrical contact members 212. The housing also includes an opening to receive an end of an electrical connector, for example a front-facing patch plug 300 or a rear-facing patch plug 400, to place electrical contacts at the end of the patch plug 300 or 400 in electrical communication with at least some of the wires.

Returning to FIGS. 2 and 3, the system 10 includes a shielding interface 110a for each disconnect module 100. The shielding interface 110a is simultaneously contactable with shielding 52a of the shielded cable 50a (FIGS. 1, 4 and 5), a corresponding shielding interface 500 of the patch plug 400 (FIGS. 11B, 11C, 12), and the earthed support 12.

Advantageously, simultaneous contact between the shielding interface 110a, shielding of the cable 50a, the corresponding shielding interface 500 of patch cord 400 and earthed support (backmount frame) 12 provides a common earth throughout the electrical connections of the system 10, thereby improving the signal-to-noise ratio of the system 10.

With continued reference to FIGS. 1 to 3, each cable manager 150 includes a pair of projections 152 (only one of which is shown in the Figures), one at the rear of each of its end panels 151, which are shaped to sit within apertures 14 in the frame 12. End panels 151 of the cable manager 150 are preferably resilient panels which can flex to allow the projections 152 to locate within the apertures 14 and hold the cable manager 150 in place on the backmount frame 12.

At the front of each end panel 151, a hook 154 of a snap-fit mechanism projects forwardly of cable manager 150. The hooks 154 fit within corresponding recesses 104 (FIG. 8B) of the disconnect module 100 to retain the module 100 on the cable manager 150.

Figure 5:
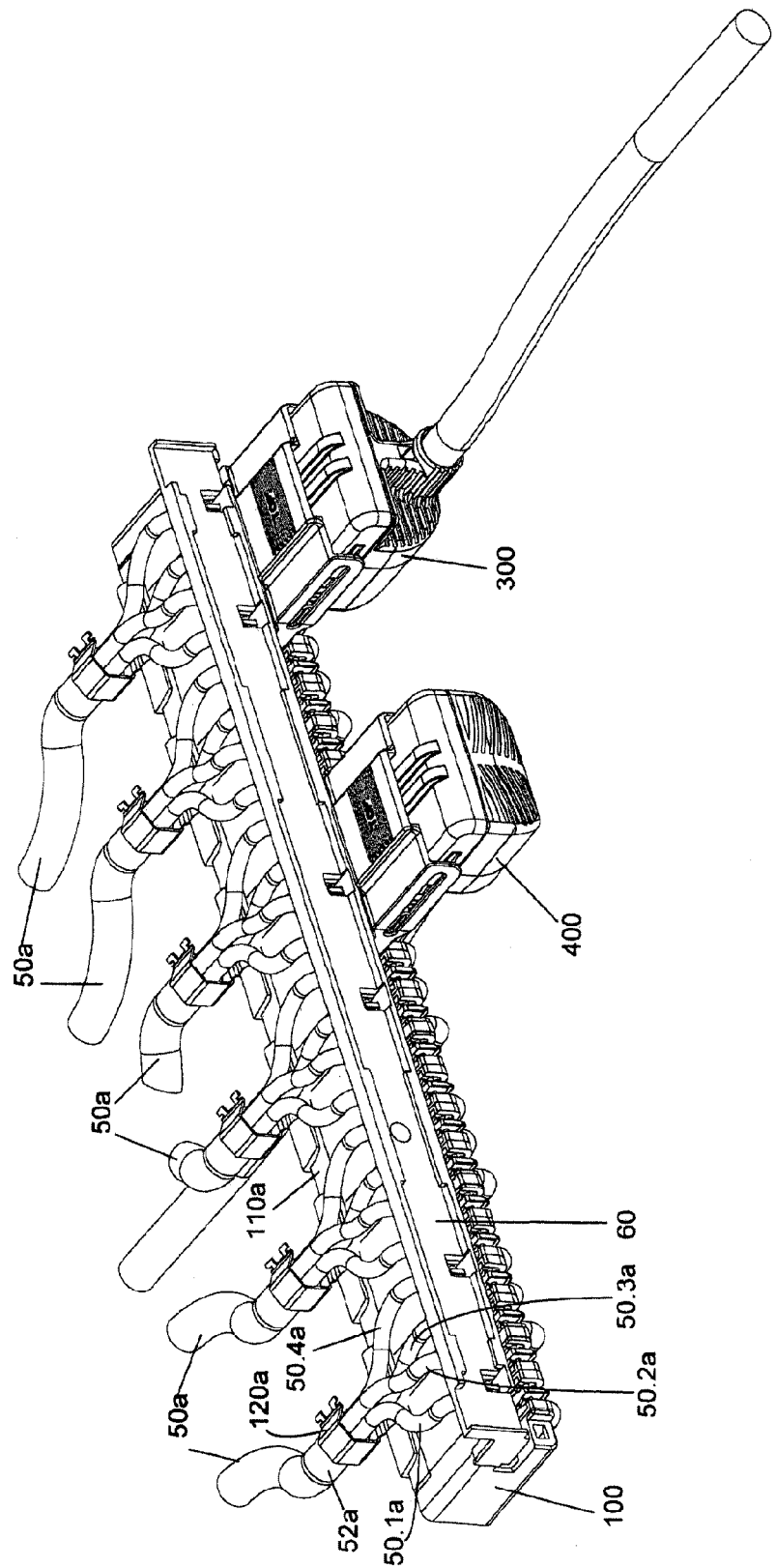
FIG. 5 is a perspective view of the module of FIG. 4.

The disconnect module 100 can accommodate up to 24 pairs of wires in each row, although it will of course be appreciated that any desired number of pairs can be accommodated in a single module. Thus, for example, the wires of six twisted-pair cables, each including four pairs 50a.1 to 50a.4 as shown in FIGS. 4 and 5, can be terminated on the top row of a module 100. Accordingly, the cable manager 150 includes six cable retention members 156, one for each cable. Each cable retention member 156 has a resilient downwardly-arched arm 156a located opposite a pair of protrusions 156b on the upper surface of the cable manager 150 (FIG. 2). The gap between the arm 156a and the protrusions 156b is less than the thickness of a cable 50a, such that the cable 50a can be pushed into the gap, thereby deflecting the arm 156a upwards and allowing the cable to pass over the protrusions 156b such that the cable is retained between arm 156a and protrusions 156b.

In the system 10, a first set of cables 50a, which may each for example have one end connected to a port of a switch or router, may be passed through an aperture 16 in backmount frame 12. The wire pairs 50a.1 to 50a.4 of the first set of cables 50a are terminated onto the IDCs of upper rows 107 of a first set of disconnect modules 100. A second set of cables 50b (FIG. 12), which may have their respective ends connected to end user equipment such as computer systems (provided with network interfaces), telephony equipment and the like, may also be passed through the aperture 16, and the wires of the second set of cables terminated onto the IDCs of upper rows 107 of a second set of disconnect modules 100. Cross-connects may then be formed by terminating a series of cables between respective lower rows 108 of the first and second sets of disconnect modules 100.

Cable manager 150 may include a plurality of forwardly projecting arms 158. The arms 158 provide mechanical support for disconnect module 100 along its length, particularly when wires are terminated into IDC slots of the disconnect module 100 as will later be described.

Cable manager 150 includes a bracket to receive an electrically conductive member 160. The electrically conductive member 160 has at one end a finger 164 and at its opposite end two pairs of tines 162. As best seen in FIG. 3, when the cable manager 150 is mounted to the backmount frame 12 and the disconnect module 100, the finger 164 of shielding member 160 contacts with the backmount frame 12, and the tines 162 engage with a shielding bar 110 of the disconnect module 100 to form an interference fit. This ensures, when the backmount frame 12 is connected to a protective earth, that the shielding bar 110 is also earthed.

Referring now to FIGS. 6, 7A, 7B, 8A and 8B, there is shown a connection module 100 including an outer shell 200 and an inner shell 220. Housed between the inner shell 200 and the outer shell 220 are a plurality of electrical contact members 212 which are arranged as an upper row 212a and a lower row 212b. Blades 257a of the electrical contact members 212a of the upper row are at least partially exposed via recesses 202 (FIG. 8A) between adjacent islands 107a of an upper row 107 of the module 100. Similarly, blades 257b of the electrical contact members 212b of the lower row are at least partially exposed via recesses 202 between adjacent islands 108a of a lower row 108 of the module 100.

The outer shell 200 preferably includes an electrically conductive material. For example, the outer shell may be formed of a metal or a metallised polymer, and/or may include a conductive surface coating, for example a metallic coating. The entire outer shell may be electrically conductive, or may be formed of individual electrically conductive portions, which may or may not be separated by non-conductive portions. The electrical conductivity of the outer shell 200 provides shielding against alien crosstalk.

Each electrical contact member 212a, 212b may be received in an insulating means 214 comprising a plurality of insulating members (contact carriers) 900. As shown in FIGS. 9A to 9E, each contact carrier 900 includes an upper pair 910 and a lower pair 912 of cavities. Accordingly, the blades 257a of upper contact members 212a are received in upper cavities 910, and the blades 257b of lower contact members 212b are received in lower cavities 912.

The insulating means 214 depicted in the drawings comprises a plurality of individual contact carriers 900. However, it will also be appreciated that the insulating means can be formed as a unitary component, for example by an injection moulding process.

Figure 8A:
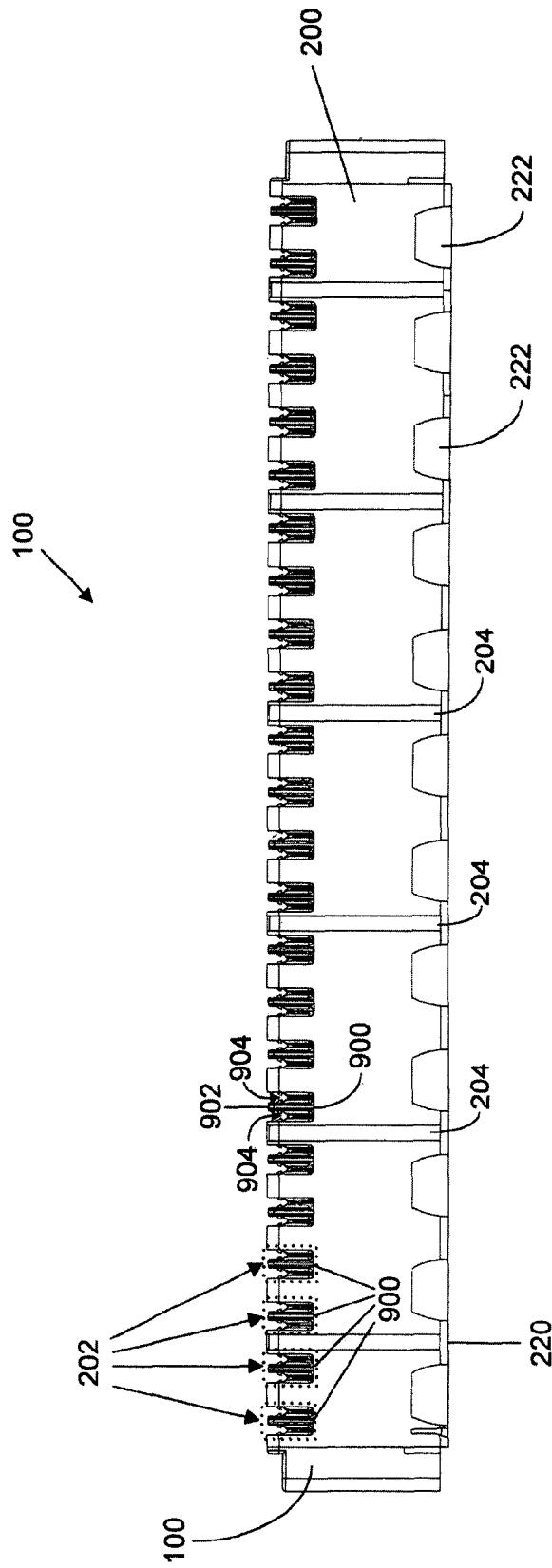
FIG. 8A is a bottom plan view of the module of FIG. 6.
Figure 8B:
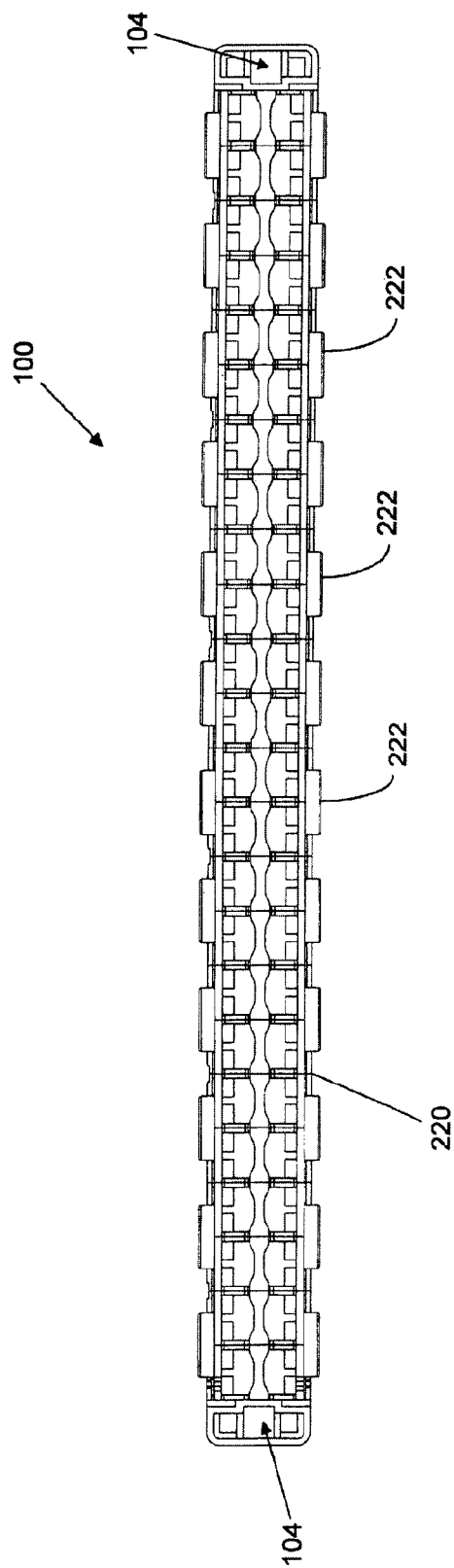
FIG. 8B is a rear plan view of the module of FIG. 6.
Figure 10A:
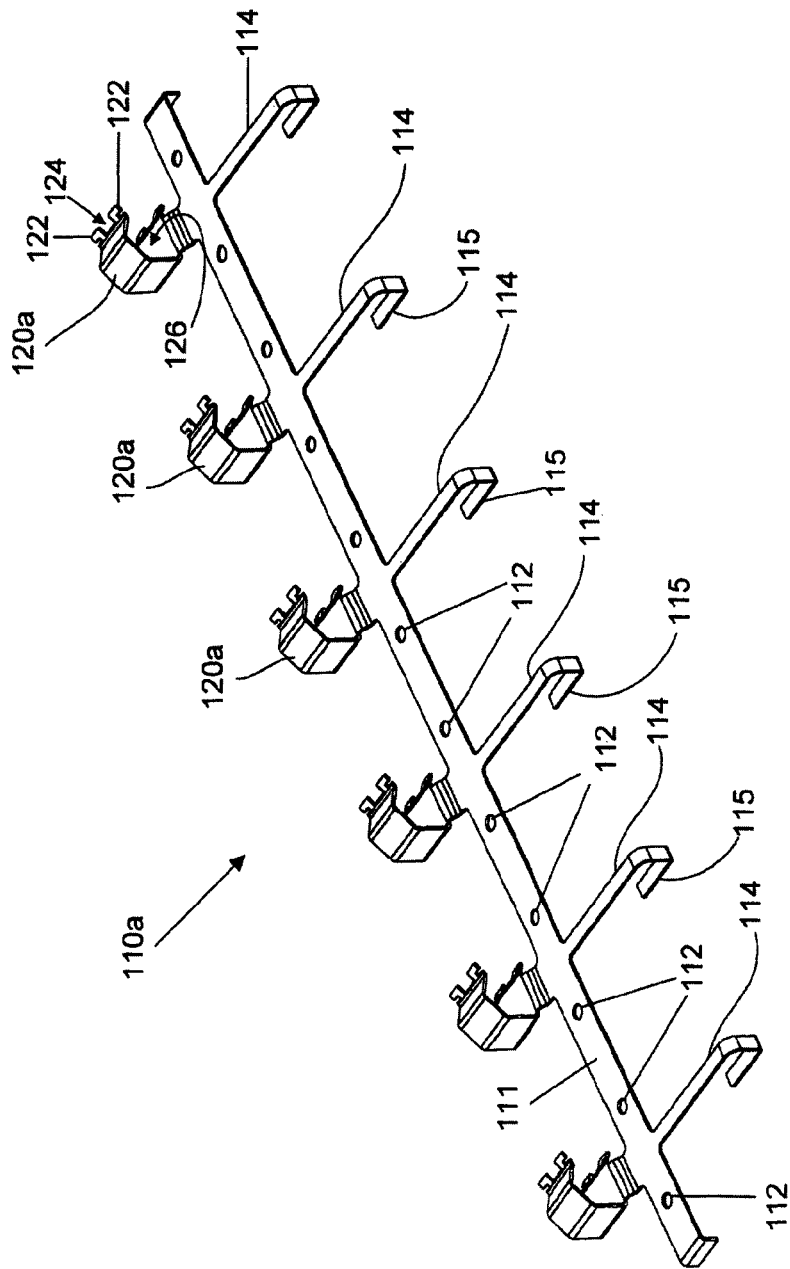
FIG. 10A is a top perspective view of an example of a shielding bar for use with the connection module of FIG. 6.
Figure 10C:
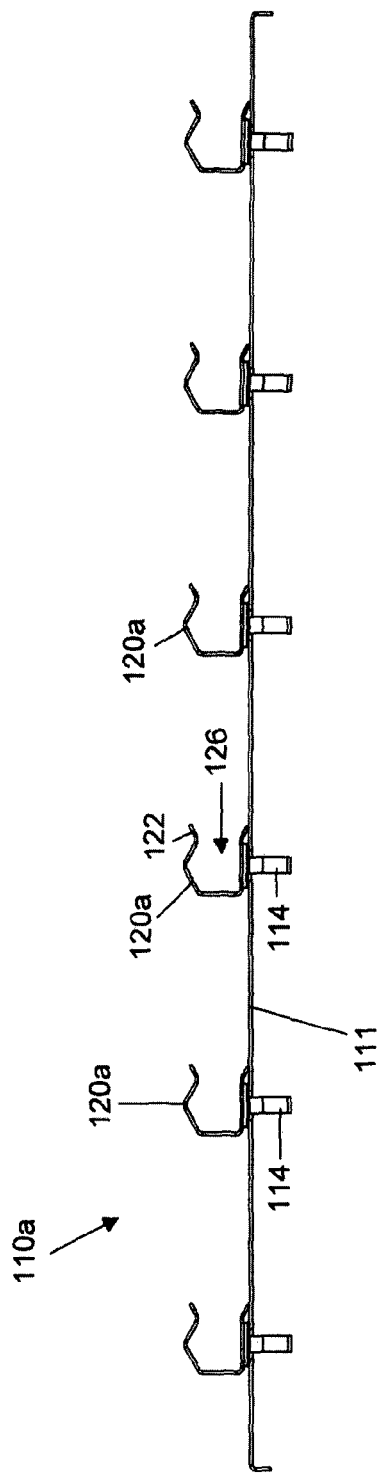
FIG. 10C is a front plan view of the shielding bar.
Figure 10D:
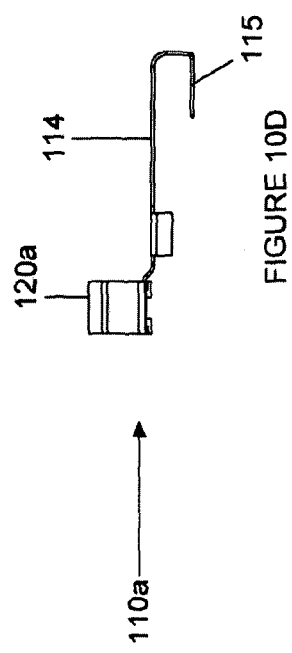
FIG. 10D is a right-side view of the shielding bar.

To assemble the module 100, front ends (blades) 257a, 258b of electrical contact members 212a, 212b are inserted into contact carriers 900. Resilient rear ends 258a, 258b of the upper 212a and lower 212b contact members are inserted into recesses 224 of the inner shell 220 such that the rear ends 258a, 258b are in electrical contact, and outer shell 200 is then placed over the inner shell 220 and contact carriers 900 such that the contact carriers 900 are seated in cavities (not shown) in the outer shell 200, with a central rib 902 of each contact carrier 900 (FIG. 9C) protruding into recesses 202 in the outer shell 200 (FIG. 8A). When the module 100 is assembled, wire-receiving recesses 904 of the contact carriers 900 are accessible via the recesses 202 of the outer shell 200.

To assist in retaining the inner shell 220 on the outer shell 200, resilient tongues 222 are provided on the inner shell 220. These may engage directly with outer surfaces of the outer shell 200, or may be disposed so as to engage with protrusions 206 on the outer shell surface. The outer shell 200 may include protrusions 206 on both its upper and lower surfaces (only those protrusions on the upper surface being shown in FIG. 7A).

The outer shell 200 of module 100 has a plurality of grooves 204 formed on its lower surface to receive fingers of a shielding bar as will later be described. The grooves 204 extend from the rear of outer shell 200, across the width of the lower surface to the front of the outer shell, and around the front, ending in a flattened portion 205 (FIG. 6) in the lower row 108 of the module 100.

In like fashion, a further plurality of grooves may also be formed on the upper surface of outer shell 200, in opposed relationship to the grooves 204, if desired. If so, said grooves may end in flattened portions in the upper row 107 of the module 100.

Turning now to FIGS. 10A to 10D, there is shown a shielding bar 110a for use with the module 100 and system 10. The shielding bar includes an elongate body in the form of a bar or strip 111 of an electrically conductive material. The elongate strip 111 has projecting from one of its long edges a series of clasps 120a, each of which is associated with a finger 114 having a hooked end 115. Fingers 114 are rigid, but may also be made resilient if desired. The elongate strip 111 also has formed therein a series of holes 112 which are shaped and located to fit the protrusions 206 on the surface of the outer shell 200 of the connection module 100.

Each of the clasps 120a is substantially C-shaped in cross section and has a conduit 126 which is sized and shaped so as to accommodate a shielded cable 50a as shown in FIGS. 4 and 5. Each clasp 120a includes a pair of ears 122 defining a recess 124 therebetween. The recess 124 is sized to fit a cable tie which is wrapped around the clasp 120a in order to secure the clasp 120a to the shielding foil 52a of the shielded cable 50a (FIGS. 4 and 5, cable tie not shown) in order to maintain electrical connection between the shielding bar 110a and the foil 52a.

Figure 6:
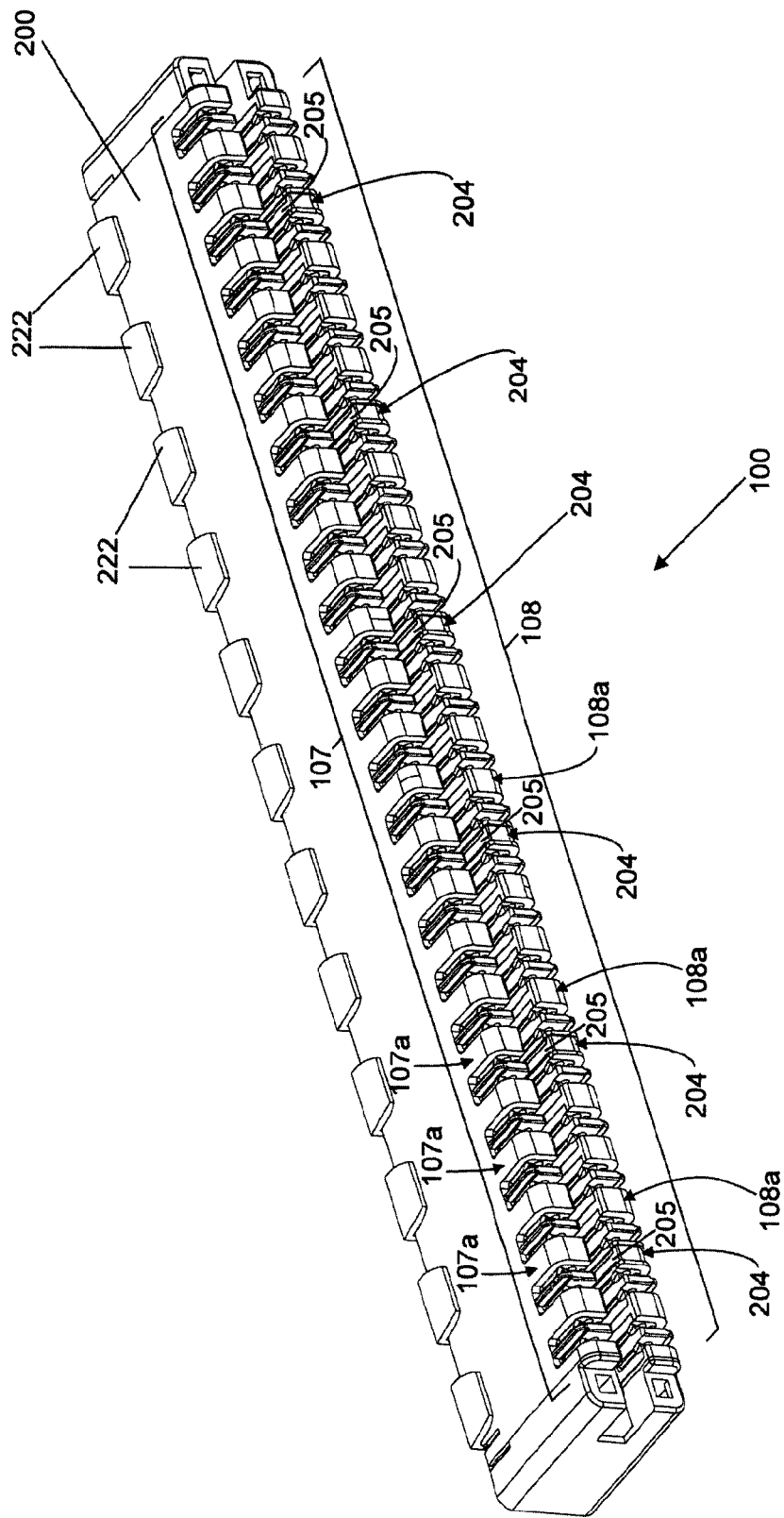
FIG. 6 is a perspective view of the module of FIGS. 4 and 5, prior to termination of the cables.

To fit the shielding bar 110a to the module 100 shown in FIGS. 7A, 7B and 8A, inner shell 220 is removed (if it has previously been attached to outer shell 200). The fingers 114 are seated within grooves 204 on the lower surface of the outer shell 200, such that hooked ends 115 pass into the space defined between upper row 107 and lower row 108 of the module 100, and are received in seating regions 205 (FIG. 6). Apertures 112 of the shielding bar are fitted over protrusions 206 on the lower surface of outer shell 200 to further assist in retaining the shielding bar 110a on the outer shell 200.

The shielding bar 110a shown in FIGS. 10A to 10D includes fingers 114 and hooked ends 115 for the purpose of establishing electrical contact with a corresponding shielding member of a patch plug, as will later be described. However, it will be understood that, if the shielding bar is to be used primarily to contact the foil (via clasps 120) of a shielded cable 50a, the fingers 114 may be omitted. A fingerless shielding bar of this type may be affixed to the outer shell 200 of a module 100 by fitting apertures 112 over protrusions 206 on the outer shell surface as previously described.

So, for example, if a first shielding bar has been attached by fitting its fingers 114 to grooves 204 in the lower surface of the outer shell 200, a second, fingerless shielding bar may then be attached to the upper surface of the outer shell 200. If both the upper and lower surfaces of the outer shell 200 include grooves 204, then it will be appreciated that a second, fingered, shielding bar 110b (FIG. 12) may be attached in similar fashion to the first shielding bar 110a as described above.

Once the shielding bar or bars 110a, 110b have been attached to outer shell 200, inner shell 220 is then re-attached (or attached), the tongues 222 being pushed over the shielding bar (or bars) 110a, 110b so as to secure the inner shell 220 to both the shielding bar (or bars) 110a, 110b and the outer shell 200.

Figure 11A:
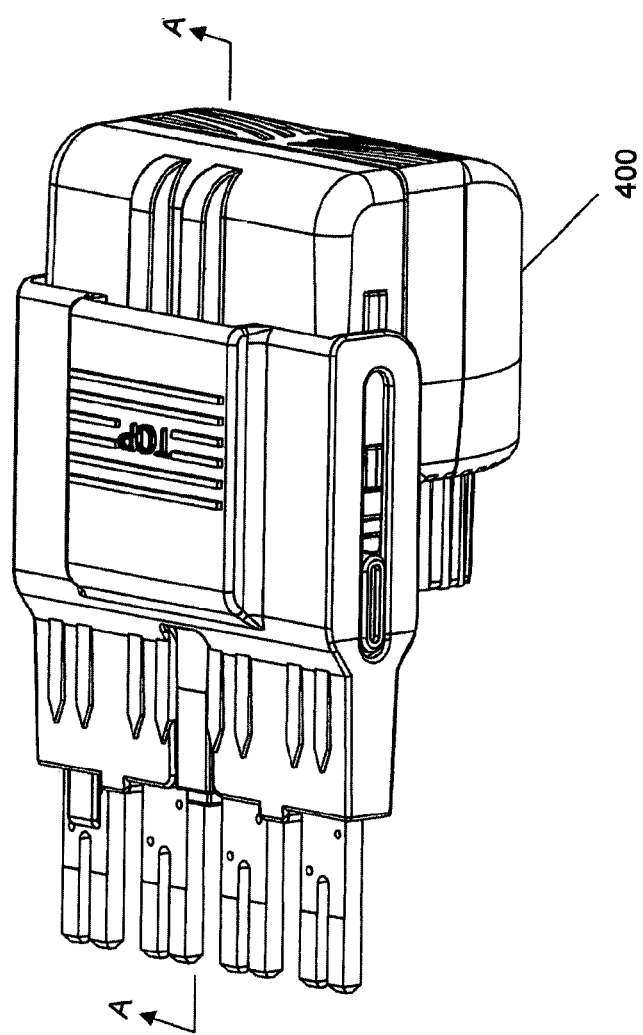
FIG. 11A is a top perspective view of an example rear-facing patch plug.
Figure 11B:
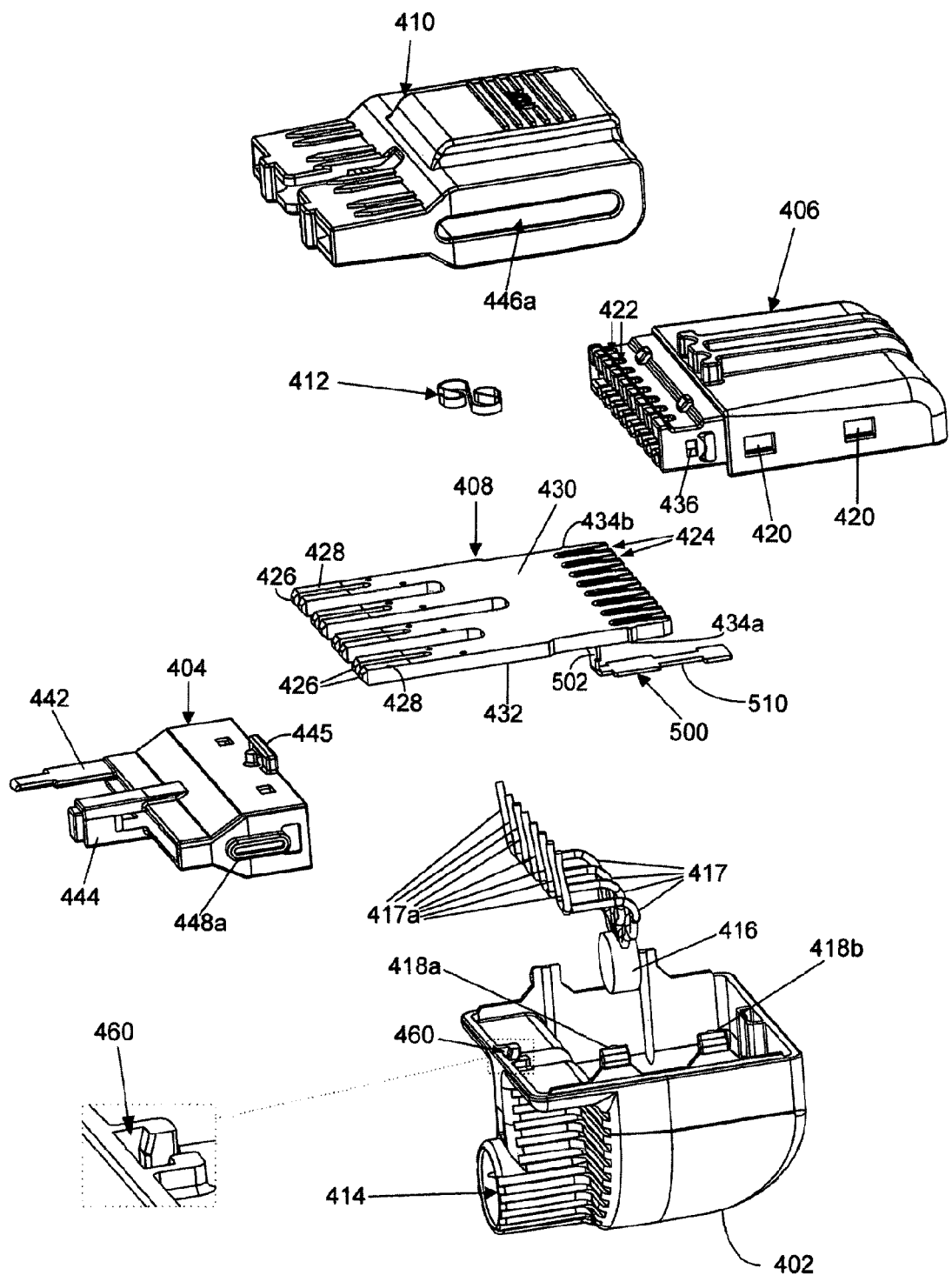
FIG. 11B is an exploded view of the patch plug of FIG. 11A.
Figure 11C:
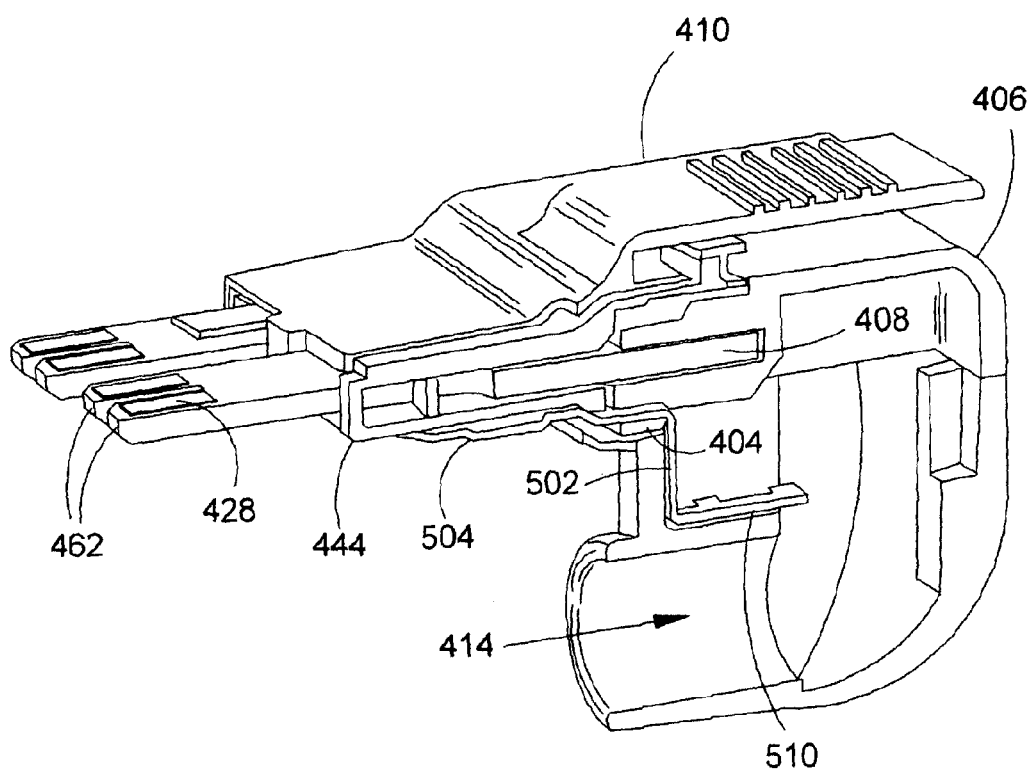
FIG. 11C is a cross-section through the line A-A of FIG. 11A.

With reference now to FIGS. 11A to 11C, there is shown an electrical connector, in the form of a rear-facing patch plug 400, for use with the system 10.

The electrical connector 400 includes a connector body having a first member 402 and a second member which is made up of an upper shell 406 and a lower shell 404. Connector 400 further includes an electrical connector element 408, an insulation shield 410 and a biasing means 412, such as a spring. The first member 402 has an opening 414 formed through the member 402 for receiving one or more wires 417a from an electric cable 416 (only the very end of which is shown). The connector 400 can be used with any type of electric cable 416, but in the present example, the cable 416 is a shielded multi-cored cable with wires 417a corresponding to one or more twisted pairs 417. Each twisted pair 417 is surrounded by a metallic foil, and the collection of pairs is surrounded by a shielding foil (in similar fashion to shielding foil 52a of cable 50a, as shown in FIGS. 1, 4 and 5).

The first member 402 has latching means formed on an inner surface of the member 402. The latching means includes one or more resilient latching posts 418a and 418b, each having an enlarged head portion which includes a shoulder that gradually increases the cross-sectional thickness of the head portion in a direction away from the exposed end of the latching post 418a and 418b. The head portion includes a flanged portion formed substantially normal to the length of the latching post 418a and 418b, which defines the transition from the larger cross-sectional thickness of the head portion to a smaller cross-sectional thickness of the latching post 418a and 41b. The latching posts 418a and 418b on the first member 402 are aligned with a corresponding recess 420 formed in the upper shell 406 of the second member. When the first member 402 and second member 404, 406 are coupled together, the head portion of a latching post 418a and 418b engages within a respective recess 420 in the upper shell 406 so that the resilience of the latching posts 418a and 418b securely holds the first member 402 and upper shell 406 together.

The first member 402 and the upper shell 406 of the second member, when coupled together, define a cavity between the parts 402 and 406. The upper shell 406 of the second member includes one or more wiring slots 422, each for receiving the end of a respective wire 417a from the cable 416. The wiring slots 422 are preferably IDC slots with contacts 424 which displace the insulation at the end of a wire within the cavity to establish electrical contact. For example, each contact slot 424 includes a surface made of a conducting material (e.g. copper) for directly contacting and making an electrical connection with the end of a wire (not shown) held in place by a wiring slot 422 of upper shell 406. The size of each contact slot 424 is sufficiently small to securely grip the end of a wire.

The connector element 408 includes one or more fingers 426, each finger 426 having a contact portion 428 for making electrical contact. The connector element 408 is substantially flat and has conducting paths (not shown) formed on the upper surface 430 and/or the lower surface 432 to provide an electrical connection between each contact slot 424 with a respective contact portion 428 of a finger 426. The connector element 408 may be a printed circuit board with etched conducting paths on one or both sides 430, 432. In the arrangement shown in FIG. 11B, the contact slots 424 for receiving wires of a twisted pair are connected by conducting paths to respective contact portions 428 on adjacent fingers 426.

The connector element 408 is made for mating assembly with the upper shell 406. The connector element 408 includes one or more retaining notches 434a and 434b that engages with a corresponding retaining recess 436 formed in the upper shell 406 to securely couple the parts 406 and 408 together.

The adjustable insulation shield 410 is made of a non-conductive material (e.g. polycarbonate or polyvinylchloride), and has one or more guiding slots 446a and 446b formed in the shield 410. In some embodiments, as shown in FIG. 11B, the guiding slots 446a and 446b are formed through sidewalls of the shield 410. In other embodiments, the guiding slots 446a and 446b may comprise recesses formed on the inner surface of the shield 410 but not formed through the sidewalls of the shield 410.

The guiding slots 446a and 446b engage with a corresponding guiding protrusion 448a and 448b formed on the outer surface of the lower shell 404, so that the shield 410 is able to move by sliding relative to the second member 404, 406, and wherein the movement of the shield 410 is guided by the guiding protrusions 448a and 448b. The guiding protrusions 448a and 448b are sufficiently long and snugly received in slots 446a and 446b so as to maintain stability of the shield 410 during movement.

The shield 410 is moveable along the length of the second member 404, 406 between an extended second position and a retracted first position, such that when the shield 410 returns to the first position, the contact portions 428 of the fingers 426 are exposed for direct contact. When the shield 410 is moved to the second position, the shield covers the contact portions 428 of the fingers 426 to minimise direct contact with the contact portions 428.

The electrical connector 400 includes biasing means 412 that tends to move the shield 410 towards the second position. The biasing means 412 may include a suitable form of compression spring, and may specifically comprise an S-shaped spring as shown in FIG. 11B. The biasing means 412 is positioned between the shield 410 and the lower shell 404 of the second member, and the biasing means 412, when compressed, pushes against a boss portion 445 of the lower shell 404 and an inner wall of the shield 410 to bias the shield 410 towards the second position. The S-shaped spring shown in FIG. 11B has one end registered with boss portion 445 and has its other end registered with another boss portion (not shown) on shield 410 so that the spring is retained in position during compression and expansion.

A u-shaped supporting portion 444 on lower shell 404 is positioned to mate with a complimentary u-shaped slot extending centrally in the direction of contact portions 428 on connector element 408. When connector 400 is assembled, supporting portion 444 assists in holding connector element 408 in place within the connector body. A keying finger 442 extends from lower shell 404 and aids in ensuring electrical connector 400 is correctly terminated when connecting to a patch panel, for example at connection module 100.

The electrical connector 400 includes, in the first member 402, a substantially T-shaped slot 460 to receive an upright portion 502 of contact shielding member 500. The shielding member 500 includes a recessed portion 510, disposed substantially perpendicular to the upright portion 502, around which the drain wire and shielding foil of cable 416 are wrapped.

As shown in FIG. 11C, contact shielding member 500 includes an exposed portion 504 which protrudes through an opening in lower shell 404 so as to lie outside the body of the connector 400. Exposed portion 504 underlies the u-shaped supporting portion 444 of the lower shell 404.

Forward-facing patch plug 300 is configured substantially identically to rear-facing patch plug 400, except that a cable-receiving aperture of forward-facing plug 300 is located at an end of a first member of the plug 300 which is disposed opposite the contacts of the plug 300, in contrast to rear-facing plug 400 in which the cable-receiving aperture 414 is disposed adjacent the contacts 428 of the plug 400.

Figure 12:
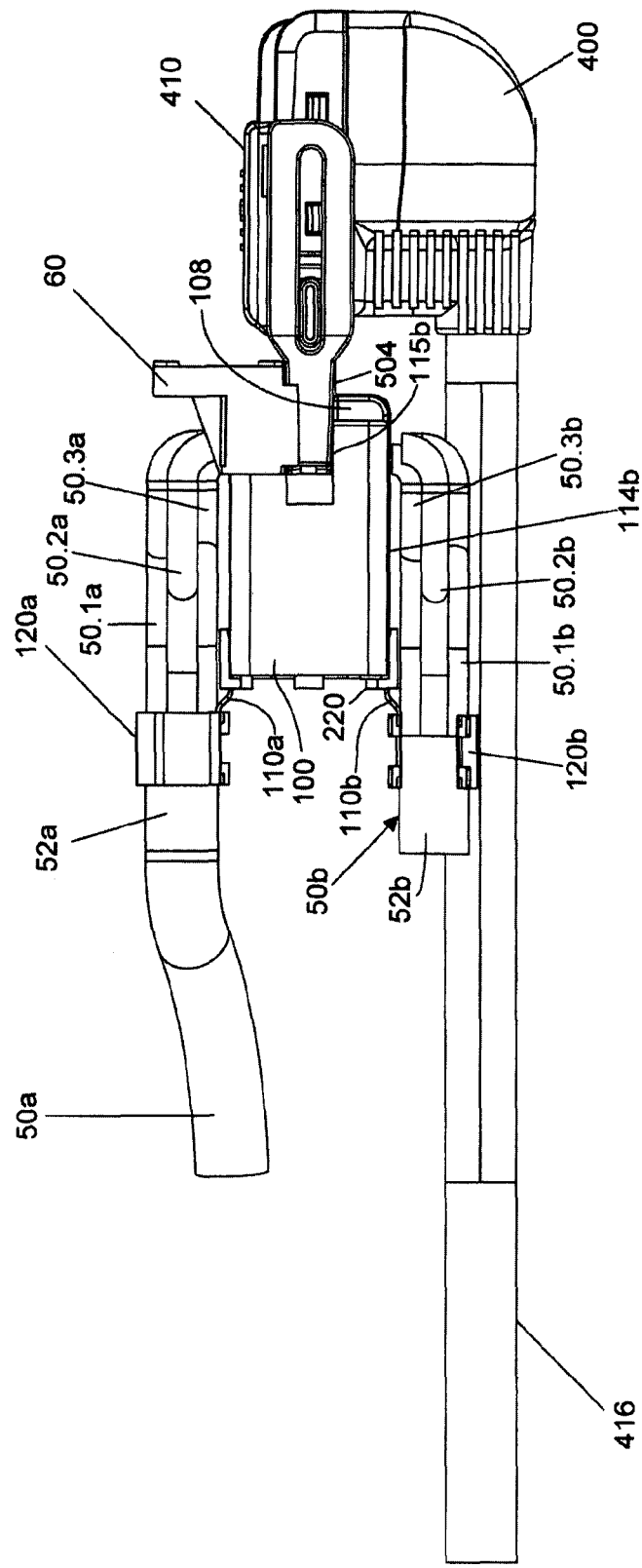
FIG. 12 shows a side view of FIGS. 4 and 5.

Turning now to FIG. 12, the connector 400 is shown terminated at a connection module 100 to which are attached two shielding bars 110a, 110b. Upper shielding bar 110a is in electrical contact, via clasp 120a, with a shielding foil 52a of a first shielded cable 50a which includes four shielded pairs of wires (only three pairs 50.1a, 50.2a, 50.3a of which are shown) which are terminated onto IDCs of the module 100 as described above. Similarly, lower shielding bar 110b is in electrical contact via its clasp 120b with a shielding foil 52b of a second shielded cable 50b, which includes four shielded pairs of wires (only three pairs 50.1b, 50.2b, 50.3b of which are shown) which are terminated onto IDCs of the module 100.

Finger 114b of shielding bar 110b extends around the lower part 108 of module 100 and terminates in hooked portion 115b which is seated in a seat 205 of groove 204 (FIG. 6). With the connector 400 inserted, exposed portion 504 aligns and comes into contact with hooked portion 115b, such that the shielding bar 110b is in electrical contact with the contact shielding member 500, and in turn with the drain wire and shielding foil of the cable 416 of connector 400.

As can be seen from the foregoing discussion, each element of the system 10 includes means for electrically contacting (directly or indirectly) the grounded support means 12 such that a common earth is established throughout the system 10. In the absence of patch plugs 300, 400, the shielding foils of cables 50a (with wires terminated on upper row 107 of module 100) and 50b (with wires terminated on lower row 108) are in contact with respective shielding bars 110a, 110b, which in turn are in contact with the electrically conductive member 160, which is in turn in contact with the backmount frame 12. When a patch plug 400 is inserted, contact shielding member 500 (which is in contact with the drain wire and shielding foil of cable 416) comes into contact with shielding bar 110b (via hooked portion 115b as shown in FIG. 12) so that the common earth is maintained.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LISTING OF PARTS 10 cabling system
12 backmount frame
14 apertures of backmount frame (to fit cable manager)
16 aperture (to receive cables)
50a upper shielded cable
50.1a-50.4a pairs of upper shielded cable
50b lower shielded cable
50.1b-50.4b pairs of lower shielded cable
52a shielding foil of upper cable
52b shielding foil of lower cable
60 label holder
100 connection module
104 recesses to fit hooks of cable manager
107 upper row of connection module
107a islands of upper row
108 lower row of connection module
108a islands of lower row
110a upper shielding bar
110b lower shielding bar
111 elongate body of shielding bar
112 holes of shielding bar
114 fingers of shielding bar
115 hooked portions of shielding bar
120a clasps of upper shielding bar
120b clasps of lower shielding bar
122 ears of clasps
124 recess for cable tie
126 conduit for shielded cable
150 rear cable manager
151 end panels of cable manager
152 protrusions of cable manager
154 hook of snap-fit for cable manager
156 cable retention member
156a arm of cable retention member
156b protrusions on upper surface of cable manager
158 forwardly projecting arms
160 electrically conductive member
162 tines of electrically conductive member
164 finger of electrically conductive member
200 inner shell of connection module
202 recesses of outer shell
204 grooves for fingers of shielding bar
205 seat for hooked portion of shielding bar
206 protrusions on outer shell surface
212 electrical contact members
212a upper row of electrical contact members
212b lower row of electrical contact members
214 insulating members (contact carriers)

220 inner shell
222 tongues of inner shell
224 contact-receiving recesses of inner shell
300 forward-facing patch plug
400 rear-facing patch plug
402 first member of patch plug
404 lower shell of second member
406 upper shell of second member
408 electrical connector element (PCB)
410 insulation shield
412 spring
414 cable aperture
416 cable
417 twisted pair of cable
417a wires of cable
418a, 418b latching posts
420 recesses for latching posts
422 wiring slots
424 contact slots
426 contact fingers
428 contacts
430 first side of PCB
432 second side of PCB
434a, 434b retaining notches
436 retaining recess
442 keying finger
444 supporting portion
445 boss
446a, 446b guiding slots
448a, 448b guiding protrusions
460 T-shaped slot
500 contact shielding member
502 upright portion of contact shielding member
504 exposed portion of contact shielding member
510 recessed portion of contact shielding member

The invention claimed is:

1. A shielding interface for an electrical connection module, the electrical connection module being configured to receive wires of a plurality of first shielded cables, the plurality of first shielded cables absent a patch plug, and to receive a plurality of patch plugs, each of the plurality of patch plugs having shielding electrically connected to corresponding second shielded cables and each of the plurality of patch plugs having a plurality of insulation displacement contact slots to receive insulation displacement contacts, the shielding interface including at least one conductive clasp for establishing an electrical connection with the shielding of the first shielded cable and including at least one finger for establishing an electrical connection with the shielding of the patch plug that is inserted into the electrical connection module, wherein the shielding interface connects the shielding of the first shielded cable to the shielding of the second shielded cable via the shielding patch plug.

2. The shielding interface of claim 1, wherein the conductive clasp has a substantially c-shaped cross section.

3. The shielding interface of claim 2, wherein the conductive clasp has a recess to receive a cable tie to fasten the conductive clasp to the first shielded cable.

4. The shielding interface of claim 3, wherein the conductive clasp extends from an elongate conductive strip or bar.

5. The shielding interface of claim 1, the shielding interface further including a retainer configured to retain the shielding interface on a housing of the connection module.

6. The shielding interface of claim 5, wherein the retainer includes the at least one finger which is configured to bear against the housing.

7. The shielding interface of claim 6, wherein the at least one finger is receivable in a groove of the housing.

8. The shielding interface of claim 7, wherein the at least one finger includes an end portion configured to be seated within the housing.

9. The shielding interface of claim 8, wherein the end portion is engageable with the shielding at least one of the plurality of patch plugs when the end portion is inserted into the electrical connection module.

\* \* \* \* \*